United States Patent
Jarnagin, III

(10) Patent No.: US 10,158,721 B2
(45) Date of Patent: Dec. 18, 2018

(54) FACILITATING INDIVIDUALIZED USER INTERACTION WITH AN ELECTRONIC DEVICE

(71) Applicant: The Coca-Cola Company, Atlanta, GA (US)

(72) Inventor: Andrew Buchanan Jarnagin, III, Marietta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 321 days.

(21) Appl. No.: 14/445,252

(22) Filed: Jul. 29, 2014

(65) Prior Publication Data

US 2015/0039776 A1 Feb. 5, 2015

Related U.S. Application Data

(60) Provisional application No. 61/860,634, filed on Jul. 31, 2013.

(51) Int. Cl.
| | | |
|---|---|---|
| *H04L 29/08* | (2006.01) | |
| *G06Q 20/32* | (2012.01) | |
| *G07F 11/00* | (2006.01) | |
| *G06Q 30/06* | (2012.01) | |
| *H04W 4/70* | (2018.01) | |
| *H04W 4/80* | (2018.01) | |
| *H04W 76/11* | (2018.01) | |

(52) U.S. Cl.
CPC ....... *H04L 67/141* (2013.01); *G06Q 20/3278* (2013.01); *G06Q 30/0631* (2013.01); *G07F 11/002* (2013.01); *H04W 4/70* (2018.02); *H04W 4/80* (2018.02); *H04W 76/11* (2018.02)

(58) Field of Classification Search
CPC .... H04L 67/141; H04L 29/08; H04W 76/021; G06Q 20/3278
USPC ........................................................ 709/228
See application file for complete search history.

(56) References Cited

U.S. PATENT DOCUMENTS

| | | | |
|---|---|---|---|
| 8,037,511 B1 * | 10/2011 | Lundy ..................... | E05B 47/00 340/686.6 |
| 8,356,100 B2 | 1/2013 | Zhu et al. | |
| 8,417,823 B2 | 4/2013 | Luna et al. | |

(Continued)

FOREIGN PATENT DOCUMENTS

| | | |
|---|---|---|
| WO | 2006/125654 A1 | 11/2006 |
| WO | 2010/042733 A1 | 4/2010 |

(Continued)

OTHER PUBLICATIONS

International Search Report and Written Opinion dated Oct. 29, 2014 in Appln No. PCT/US2014/048928, 10 pgs.

*Primary Examiner* — Razu A Miah

(57) ABSTRACT

Facilitating an individualized interaction between a mobile computing device and an electronic device is provided. A mobile computing device may be utilized to receive an identity of the electronic device. The identity of the electronic device and other data may then be sent from the mobile computing device to a server. An individualized interaction may then be initiated via a previously established communication session between the server and the electronic device. The individualized interaction initiated in response to a determination that the mobile computing device is proximate to the electronic device.

21 Claims, 6 Drawing Sheets

(56) References Cited

U.S. PATENT DOCUMENTS

| | | | |
|---|---|---|---|
| 8,634,848 B1* | 1/2014 | Bozarth | H04W 64/00 455/41.2 |
| 2002/0161645 A1* | 10/2002 | Walker | G06Q 30/02 705/14.19 |
| 2003/0212802 A1* | 11/2003 | Rector | H04L 41/08 709/228 |
| 2004/0003112 A1* | 1/2004 | Alles | G06F 9/5011 709/237 |
| 2004/0030601 A1* | 2/2004 | Pond | B67D 7/145 705/16 |
| 2005/0167493 A1* | 8/2005 | Barton | A47F 9/047 235/383 |
| 2007/0150608 A1* | 6/2007 | Randall | H04L 67/26 709/228 |
| 2008/0320521 A1* | 12/2008 | Beadle | G06Q 30/02 725/46 |
| 2009/0042611 A1* | 2/2009 | Aigner | G06Q 20/04 455/557 |
| 2009/0065520 A1* | 3/2009 | Peters | B67D 1/0041 221/1 |
| 2009/0065570 A1* | 3/2009 | Peters | B67D 1/0041 235/378 |
| 2009/0115609 A1* | 5/2009 | Weaver | G06Q 10/08 340/572.1 |
| 2009/0210932 A1* | 8/2009 | Balakrishnan | H04W 4/02 726/5 |
| 2009/0213796 A1* | 8/2009 | Broshi | H04W 76/021 370/328 |
| 2009/0319673 A1* | 12/2009 | Peters | H04W 4/08 709/228 |
| 2010/0042827 A1* | 2/2010 | Pratt | G06F 1/3203 713/100 |
| 2010/0128695 A1* | 5/2010 | Nagaraja | H04W 76/023 370/331 |
| 2010/0235550 A1* | 9/2010 | Bolton | G06F 13/385 710/62 |
| 2010/0262701 A1* | 10/2010 | Odakura | H04L 67/14 709/228 |
| 2010/0299436 A1* | 11/2010 | Khalid | G06F 1/1643 709/226 |
| 2011/0131338 A1* | 6/2011 | Hu | H04W 76/02 709/229 |
| 2012/0005076 A1* | 1/2012 | Dessert | G06Q 20/10 705/39 |
| 2012/0029691 A1* | 2/2012 | Mockus | G06Q 20/18 700/232 |
| 2012/0124224 A1* | 5/2012 | Raboin | G06F 17/30861 709/228 |
| 2012/0249328 A1* | 10/2012 | Xiong | G10L 15/22 340/541 |
| 2012/0324024 A1 | 12/2012 | Benassaya et al. | |
| 2013/0007299 A1 | 1/2013 | German et al. | |
| 2013/0046602 A1* | 2/2013 | Grigg | G06Q 30/0261 705/14.25 |
| 2013/0047034 A1* | 2/2013 | Salomon | H04W 4/00 714/18 |
| 2013/0054016 A1* | 2/2013 | Canter | G06Q 30/0269 700/237 |
| 2013/0097239 A1* | 4/2013 | Brown | H04L 67/02 709/204 |
| 2013/0131971 A1* | 5/2013 | Parrish | G06F 3/01 701/408 |
| 2015/0172742 A1* | 6/2015 | Richardson | H04N 21/44218 725/10 |

FOREIGN PATENT DOCUMENTS

| | | |
|---|---|---|
| WO | 2012/163968 A1 | 12/2012 |
| WO | 2013/006563 A2 | 1/2013 |

* cited by examiner

FACILITATING INDIVIDUALIZED USER INTERACTION WITH AN ELECTRONIC DEVICE

CROSS-REFERENCE TO RELATED APPLICATIONS

This patent application claims priority to U.S. Patent Application Ser. No. 61/860,634, filed Jul. 31, 2013, entitled "Facilitating Individualized User Interaction with an Electronic Device," of which the disclosure is incorporated herein, in its entirety, by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Today, many stand-alone consumer devices are configured to provide an enhanced consumer experience as a means of increase the sales of various provided products and/or services. For example, a vending machine may utilize network connectivity to offer a consumer an opportunity to view a branded product/service video or play a game on an integrated display screen while the consumer is engaged with the device (e.g., the consumer is considering a purchase or waiting for a requested item to be dispensed). However, the current consumer engagement experience provided by these devices is limited due to a lack of knowledge of a consumer's particular preferences resulting in a limited consumer interaction and the presentation of generalized content. As a result of the limited interaction provided by current consumer devices, the engagement experiences provided by these devices may not be appreciated by certain consumers due to a lack of personalization. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for facilitating an individualized interaction between a mobile computing device and an electronic device. A mobile computing device may be utilized to receive an identity of the electronic device. The identity of the electronic device and other data may then be sent from the mobile computing device to a server. An individualized interaction may then be initiated via a previously established communication session between the server and the electronic device. The individualized interaction initiated in response to a determination that the mobile computing device is proximate to the electronic device.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for facilitating an individualized interaction between a mobile computing device and an electronic device. A mobile computing device may be utilized to receive an identity of the electronic device. The identity of the electronic device and other data may then be sent from the mobile computing device to a server. An individualized interaction may then be initiated via a previously established communication session between the server and the electronic device. The individualized interaction initiated in response to a determination that the mobile computing device is proximate to the electronic device.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1A:
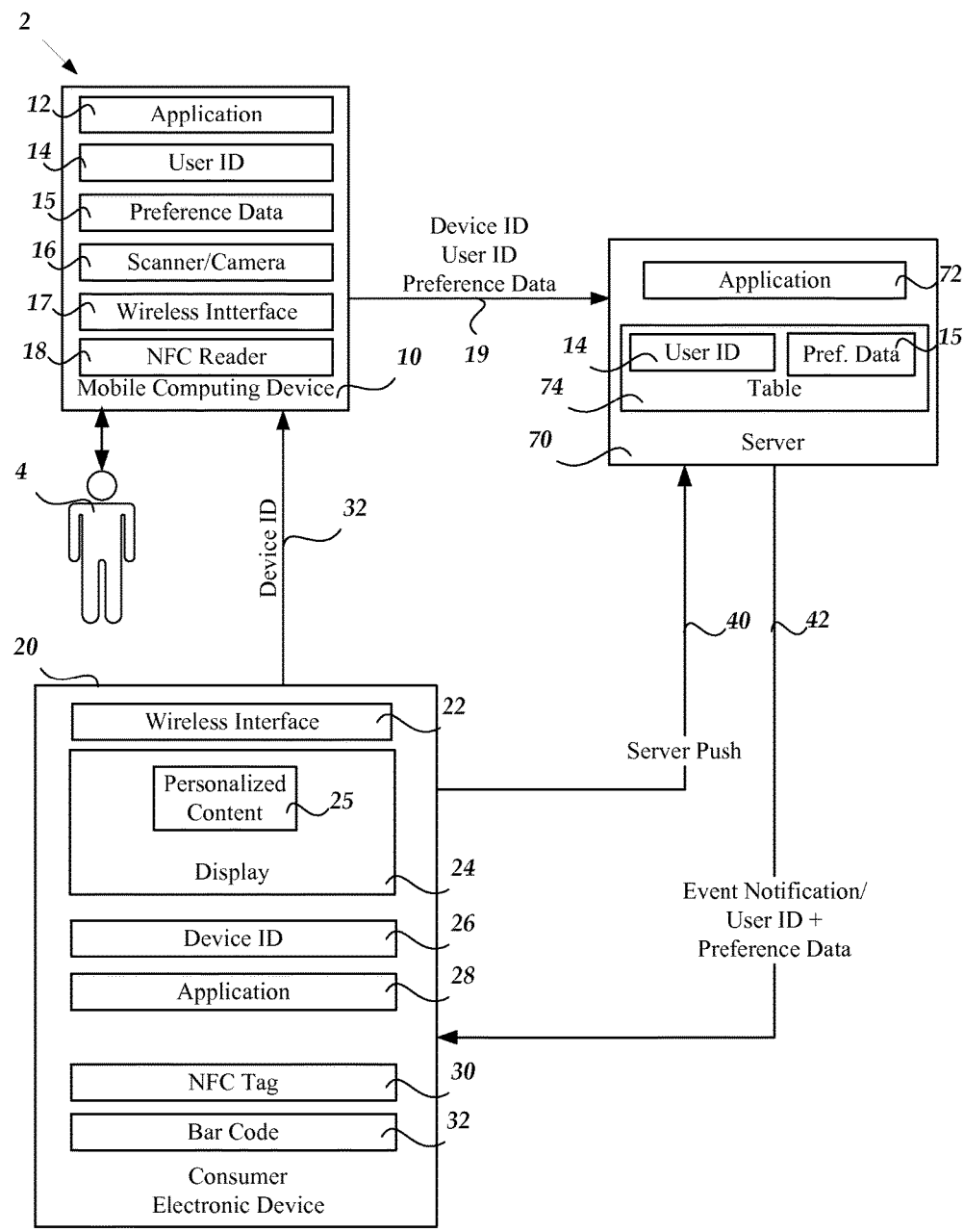
FIG. 1A is a block diagram illustrating a network architecture for facilitating an individualized interaction between a mobile computing device and an electronic device, in accordance with some embodiments.

Referring now to the drawings, in which like numerals represent like elements through the several figures, various aspects of the present invention will be described. FIG. 1A is a block diagram illustrating a network architecture 2 for facilitating an individualized interaction between a mobile computing device and an electronic device, in accordance with some embodiments. The network architecture 2 includes a mobile computing device 10 which may be utilized by a user 4 and which is in communication with consumer electronic device 20 and a server 70. In accordance with an embodiment, the computing device 10 may comprise a smartphone, tablet or laptop computer which is capable of executing one or more software application programs, such as application 12. The computing device 10 may include a scanner/camera 16 and may also be capable of short range wireless communication via wireless interface 17. The wireless interface 17 may be configured to provide short range wireless communications via any of a number of technologies known to those skilled in the art including, but not limited to, Near Field Communication ("NFC"), BLUETOOTH wireless technology, and Wi-Fi. The computing device 10 may also comprise user identification ("ID") 14 and preference data 15. It should be understood that in accordance with other embodiments, the preference data 15 may also be stored on the server 70 or in a database accessible via the server 70 and cross-referenced (e.g., via table 74) with the user ID 14. The user ID 14 may comprise an ID for the user 4 of the mobile computing device 10. The preference data 15 may comprise preferences associated with the user 4. For example, the preference data 15 may comprise a list of the user's favorite beverages, games, products, and/or restaurants, a list of the user's custom beverage mixes, and/or other information that can be used to personalize a consumer's interaction with the consumer electronic device 20. As will be described in greater detail below with respect to FIG. 2, the application 12 may be configured to send the user ID 14 and preference data 15 along with a device identification ("ID") 26 (retrieved from the consumer electronic device 20) in a notification 19 to the server 70 for conducting an individualized or unique interaction with the consumer electronic device 20. In some embodiments, the notification 19 may only include the user ID 14 and the device ID 26. Upon receipt of the device ID 26 and the user ID 14, the server 70 may obtain and communicate the preference data 15 or a subset thereof to the consumer electronic device 20. Upon receiving the device ID 26, the server 70 may determine that the mobile device 10 (and hence the user 4) of the mobile device 10 is proximate to the consumer electronic device 20. Depending on how the device ID 26 is obtained (e.g., scanning a barcode or reading an NFC tag), the server 70 may further determine that the user 4 is addressing or is otherwise ready to commence with interacting with the consumer electronic device 20. This is opposed to the user 4 being in line to use the consumer electronic device 20, but it not being the user 4's turn or the user 4 otherwise being near the consumer electronic device 20, but not ready to commence with interacting with the consumer electronic device 20.

In accordance with some embodiments, the device ID 26 may be retrieved without establishing a communication session between the mobile device 10 and the consumer electronic device 20. For example, the device ID 26 may be retrieved by using the scanner/camera 16 in conjunction with the application 12 to scan a barcode (32) (e.g., a "1D" or "2D" barcode) or other symbol encoded with the device ID 26 on the consumer electronic device 20. The barcode or other symbol may be rendered on the display 24 of the consumer electronic device 20, or printed, embossed, shown on a sticker, or otherwise made visible on one or more surfaces of the consumer electronic device 20.

In accordance with some embodiments, the device ID 26 may be retrieved by NFC reader 18 reading the device ID 26 from NFC tag 30. The NFC tag 30 may be a passive or active NFC tag that stores the device ID 26. In cone embodiments, the NFC tag 30 is an RFID tag, whereby the ID associated with the RFID tag is the device ID 26. The NFC tag 30 may be placed inside the cabinet of the consumer electronic device 20 at a location such that the NFC reader 18 on the mobile computing device 10 may still read the NFC tag 30. By placing the tag inside the cabinet of the consumer electronic device, the NFC tag 30 may be protected from tampering.

In accordance with some embodiments, the device ID 26 may be retrieved by initiating a communication session between the mobile computing device 10 and the consumer electronic device 20. For example, the mobile computing device 10 may communicate via a wireless communication session (i.e., over the wireless interface 17) with the consumer electronic device 20 using BLUETOOTH wireless technology, Wi-Fi or other wireless communication standards or technologies.

The consumer electronic device 20 may comprise a computing device capable of executing one or more software application programs such as the application 28. The consumer electronic device 20 may also be configured to provide any number of consumer services and/or products, including, without limitation, the dispensing of food and/or beverage products, video gaming services, video services, advertisement services, financial services, etc. Thus, it should be understood that the consumer electronic device 20 may include fountain or post-mix beverage dispensing machines, vending machines, public gaming devices, automated teller machines or any other electronic device or kiosk configured to provide consumer products and/or services. The consumer electronic device 20 may also include a wireless interface 22, a display 24 and the device ID 26. Similar to the wireless interface 17 in the mobile computing device 10, the wireless interface 22 may be configured to provide short range wireless communications via NFC, BLUETOOTH wireless technology, Wi-Fi or other wireless technologies. In accordance with an embodiment, the consumer electronic device 20 may be utilized to display personalized content 30 to the user 4 based on the preference data 15. For example, the personalized content 30 may include a selection of the user 4's favorite beverages which are available for purchase, advertisements targeted towards the user 4's favorite products, etc. The device ID 26 may comprise a unique identification of the consumer electronic device 20. The device ID 26 may be utilized for identifying the consumer electronic device 20 among other similar devices in a network. The application 28 may be configured to send the device ID 26 to the mobile computing device 10 in response to a communication session initiated by the user 4. As discussed above, the communication session may comprise a short range wireless communication session during which the device ID 26 is sent to the mobile computing device 10. For example, in accordance with an embodiment, the device ID 26 may be encoded in an unpowered NFC chip or "tag" (30) which may be affixed to the consumer electronic device 20. In this embodiment, the device ID 26 may be communicated when the user 4 touches or brings the mobile computing device 10 in close proximity with, the NFC tag. In accordance with another embodiment, the device ID 26 may comprise stored data on the consumer electronic device 20 and may be communicated in response to a data request made by the user 4 during a Wi-Fi or BLUETOOTH wireless technology session with the mobile computing device 10. Also, as discussed above, the communication session may comprise a scanning session initiated by the user 4. For example, the device ID 26 may be encoded in a 1D or 2D barcode (e.g., a QR code) or other symbol which may be either physically affixed to the consumer electronic device 20 or displayed by the consumer electronic device 20 on the display 24. As will be described in greater detail below with respect to FIG. 3, and in accordance with an embodiment, the application 28, executing on the consumer electronic device 20, may be configured to receive an event notification 42 from the server 70. The event notification 42 may include the user ID 14 and the preference data 15. The event notification 42 may be sent after the user ID 14, device ID 26, and the preference data 15 are received by the server 70. It should be understood that the communication between application 28 on the consumer electronic device 20 and the application 72 on the server 70 may be configured to utilize a "server push" technique in which a communication session (i.e., server push 40) is initiated and established by the consumer electronic device 20, prior to the user 4's interaction with the consumer electronic device 20. In accordance with various embodiments, the server push technology may include, but is not limited to, long polling, Comet, web sockets or Berkeley socket ("BSD") techniques. In accordance with the aforementioned techniques, the server 70 may hold the sending of a response to data requests from the consumer electronic device 20 until the requested data is available or a predetermined timeout event has occurred. Upon the user ID 14 and the preference data 15 being received by the consumer electronic device 20, the application 20 may be configured to display the personalized content 25 for the user 4 on the display 24.

The server 70, which is in communication with the mobile computing device 10 and the consumer electronic device 20, may comprise a computing device capable of executing one or more software application programs such as the application 72. It should be understood that the communication between the server 70, the mobile computing device 10 and the consumer electronic device 20 may take place via respective device network connections (not shown) over a wide area network, such as the Internet. In accordance with an embodiment, the server 70 may comprise a non-blocking socket input/output server platform which may utilize a server push technology (e.g., long polling or web sockets) whereby the consumer electronic device 20 initiates a network connection (i.e., the server push 40) with the server 70 and keeps it open. An example of a non-blocking socket input/output server platform is the ELASTIC COMPUTE CLOUD ("EC2") web service (which comprises an "infrastructure as a service" cloud computing platform) provided by AMAZON.COM, INC. of Seattle, Wash. The EC2 web service may further be utilized with Tornado which is an open source scalable, non-blocking web server and web application framework. It should be understood however, that the embodiments described herein may also be practiced in conjunction with other non-blocking socket servers and/or platforms from other providers and further, is not limited to any particular application, system, or platform. In accordance with an embodiment, the application 72 may be configured to receive the user ID 14 and the preference data 15 contained in the notification 19 from the mobile computing device 10, as via an HTTP Application Programming Interface ("API"). In some embodiments, the application 72 may only receive the user ID 14 and using table 74, may look up the corresponding preference data 15. The application 72 may further be configured to server push communications from the consumer electronic device 20. The application 72 may also be configured to delay the sending of responses to the HTTP requests from the consumer electronic device 20 until the occurrence of one of a timeout or the receipt of the notification 19.

Figure 1B:
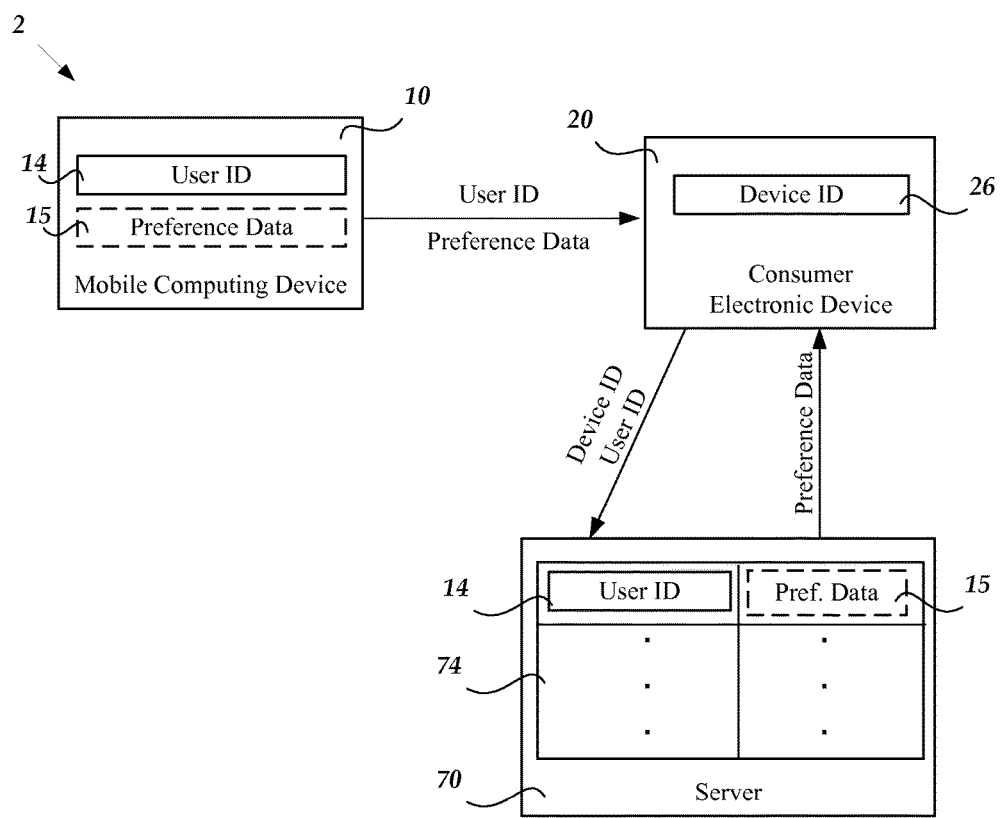
FIG. 1B is a block diagram illustrating a network architecture for facilitating an individualized interaction between a mobile computing device and an electronic device, in accordance with other embodiments.

FIG. 1B is a block diagram illustrating a network architecture 2 for facilitating an individualized interaction between a mobile computing device and an electronic device, in accordance with other embodiments. The network architecture 2 includes the mobile computing device 10 comprising the user ID 14 and, optionally, the preference data 15. It should be understood that the mobile computing device 10 may be in active communication with the consumer electronic device 20 via BLUETOOTH wireless technology, Wi-Fi or other wireless standards or technologies. The consumer electronic device 20, which stores the device ID 26, may receive the user ID 14 (and optionally, the preference data 15) from the mobile computing device 10. The consumer electronic device 20 may then send the device ID 26 to the server 70 and receive the optional preference data 15 from the server 70. The server 70 may store the table 74 which may include one or more user IDs 14 and, optionally, one or more instances of the preference data 15. As discussed above with respect to FIG. 1A, the preference data 15 may be cross-referenced (e.g., via the table 74) with the user ID 14.

Figure 2:
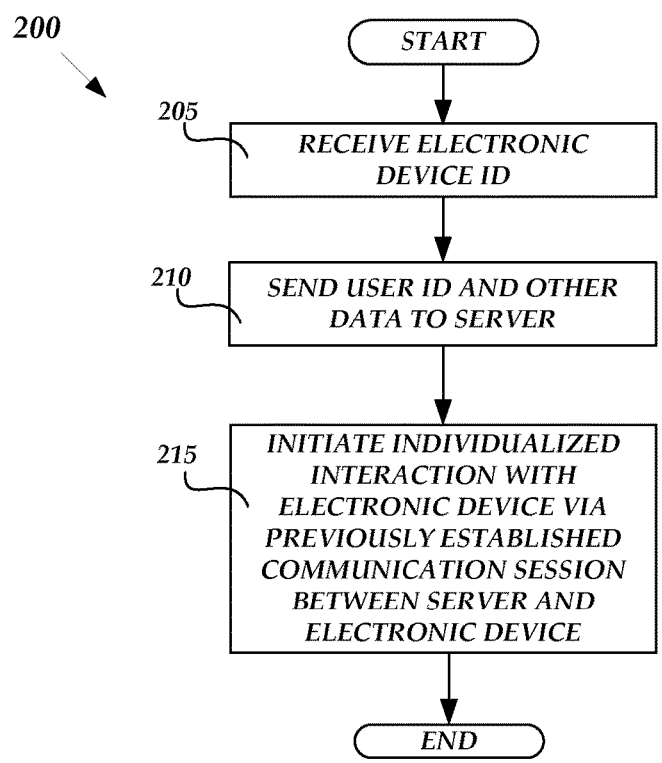
FIG. 2 is a flow diagram illustrating a routine for facilitating an individualized interaction between a mobile computing device and an electronic device, in accordance with an embodiment.

FIG. 2 is a flow diagram illustrating a routine 200 for facilitating an individualized interaction between a mobile computing device and an electronic device, in accordance with an embodiment. When reading the discussion of the routines presented herein, it should be appreciated that the logical operations of various embodiments of the present invention are implemented (1) as a sequence of computer implemented acts or program modules running on a computing device or system and/or (2) as interconnected machine logical circuits or circuit modules within the computing device or system. The implementation is a matter of choice dependent on the performance requirements of the computing device or system implementing the invention. Accordingly, the logical operations illustrated in FIGS. 2-3 and making up the various embodiments described herein are referred to variously as operations, structural devices, acts or modules. It will be recognized by one skilled in the art that these operations, structural devices, acts and modules may be implemented in software, in firmware, in hardware, in special purpose digital logical, and any combination thereof without deviating from the spirit and scope of the present invention as recited within the claims set forth herein.

The routine 200 begins at operation 205, where the application 12 executing on the mobile computing device 10, may receive an electronic device ID from the consumer electronic device 20. In particular, the user 4 of the mobile computing device 10 may establish a communication session (e.g., a wireless communication session or a scanning session) with the consumer electronic device 20 to request receipt of the device ID 26. For example, the user 4 may approach the consumer electronic device 20 with the intent to engage in an individualized interactive session associated with the purchase or dispensing of a beverage and, utilizing the application 12, address the consumer electronic device 20 to obtain the device ID 26. The consumer electronic device 20 may be addressed via a number of methods. For example, a user may type a code displayed on the consumer electronic device 20 into the mobile computing device 10. As another example, a user may use the mobile computing device 10 to read an NFCtag affixed to the consumer electronic device 20. As another example, a user may utilize the mobile computing device 10 to establish a Wi-Fi or BLUETOOTH wireless technology connection with the consumer electronic device 10. As yet another example, a user may type in a code using an onscreen or physical keyboard on the consumer electronic device 20. As yet another example, a user may use the mobile computing device 10 to scan a one or two-dimensional barcode (e.g., a QR code) or other symbol shown on a tag or sticker affixed to, printed on the consumer electronic device 20 or displayed on the display 24 of the consumer electronic device 20.

From operation 205, the routine 200 continues to operation 210, where the application 12 executing on the mobile computing device 10, may send the retrieved device ID 26 and other data (i.e., the user ID 14 and the preference data 15) to the server 70. In particular, the user ID 14, the preference data 15 and the device ID 26 may be utilized for conducting an individualized interactive session with the consumer electronic device 20. It should be understood that the preference data 15 may be sent to from the mobile computing device 10 to the server 70 (as described above) or, alternatively, from a third-party source such as a website. It should further be understood that the preference data 15 may be sent to the server 70 at any time (e.g., the preference data 15 may have been previously communicated to the server 70 prior to the establishment of the communication session between the mobile computing device 10 and the consumer electronic device 20).

From operation 210, the routine 200 continues to operation 215, where the application 12 executing on the mobile computing device 10, may initiate an individualized interaction with the consumer electronic device 20 via a previously or continually established communication session between the server 70 and the consumer electronic device 20. In particular, the individualized interactive session may be initialized in response to the server 70 receiving the user ID 14, the device ID 26, and in some embodiments the preference data 15, and from the mobile computing device 10. For example, the individualized interactive session may comprise an individualized beverage dispensing session with the user 4 of the mobile computing device 10 (e.g., the user 4 is only presented with a selection of beverages for purchase or dispensing in accordance with the preference data 15), an individualized gaming session, a purchase transaction in which the user 4 is redeeming one or more rewards points, a payment transaction in which the user 4 is making a payment, etc. It should be understood that the communication session between the server 70 and the consumer electronic device 20 may comprise the use of any number of server push techniques including, but not limited to, long polling, web socket or BSD socket techniques, by the consumer electronic device 20. It should further be understood that with respect to the aforementioned communication session, the consumer electronic device 20 does not listen for connections but rather initiates a long running connection to the server 70 that remains open. When the mobile device 10 announces that the consumer has initiated an interaction with the consumer device 20 by sending the device ID 26 and the user ID 14 to the server 70, the server 70 utilizes the already open connection to alert the consumer device 20 that the event has occurred and provide the appropriate preference data 15 and user ID 14 to the consumer electronic device 20. From operation 215, the routine 200 the ends.

Figure 3:
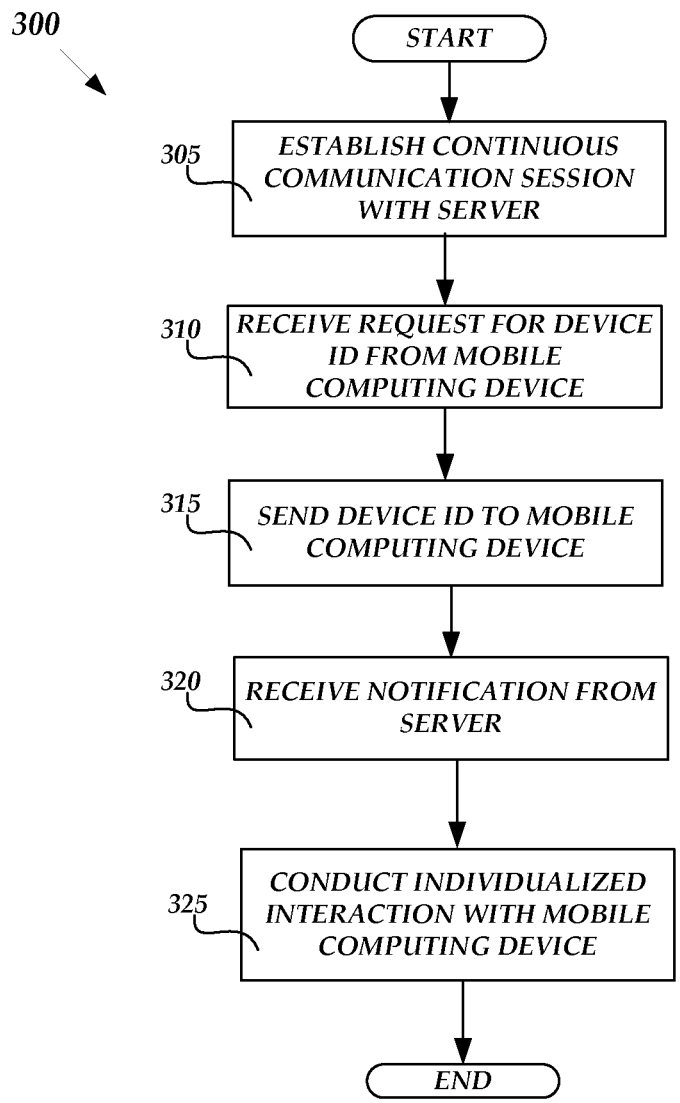
FIG. 3 is a flow diagram illustrating a routine for facilitating an individualized interaction between a mobile computing device and an electronic device, in accordance with another embodiment.

FIG. 3 is a flow diagram illustrating a routine 300 for facilitating an individualized interaction between a mobile computing device and an electronic device, in accordance with another embodiment. The routine 300 begins at operation 305, where the application 28 executing on the consumer electronic device 20, may establish a continuous communication session with the server 70. In particular, and as discussed above at operation 215 of FIG. 2, the consumer electronic device 20 may utilize various server push techniques (e.g., long polling, web sockets or BSD sockets) to communicate with the server 70. It should be understood that with respect to the aforementioned communication session, the consumer electronic device 20 does not listen for connections but rather initiates a long running connection to the server 70 that remains open.

From operation 305, in some embodiments, the routine 300 continues to operation 310, where the application 28 executing on the consumer electronic device 20, may receive a request for the device ID 26 from the mobile computing device 10. In particular (and as discussed above at operation 205 of FIG. 2), a wireless communication session may be established between the mobile computing device 10 and the consumer electronic device 20 to request receipt of the device ID 26. For example, the user 4 may approach the consumer electronic device 20 with the intent to engage in an individualized interactive session associated with the purchase or dispensing of a beverage and, utilizing the application 12, address the consumer electronic device 20 by either wirelessly addressing the consumer electronic device 20 to obtain the device ID 26. In some embodiments, the user may use the mobile computing device 10 to initiate a wireless communication session via Wi-Fi, BLUETOOTH wireless technology, or other wireless communication standards to obtain the device ID 26. In such embodiments, upon establishing the wireless communication session, the application 28 executing on the consumer electronic device 20, may receive a request from the application 12 on the mobile computing device 10 for the device ID 26.

In some embodiments, where a wireless communication session is not established between the mobile computing device 10 and the consumer electronic device 20, the application 28 executing on the consumer electronic device 20, may simply display the device ID 26 or display a barcode or other symbol or code representative of or encoding the device ID 26 on the display 24.

From operation 310, the routine 300 continues to operation 315, where the application 28 executing on the consumer electronic device 20, may send the device ID 26 to the mobile computing device 10. In particular, the device ID 26 may be communicated to the mobile computing device 10 via the wireless communication or scanning sessions discussed above at operation 305. In some embodiments, the application 28, executing on the consumer electronic device 20, may not perform either of operations 305 or 310.

From operation 315, or in some embodiments, from operation 305, the routine 300 continues to operation 320, where the application 28 executing on the consumer electronic device 20, may receive the event notification 42 (which may comprise the user ID 14 and the preference data 15) from the server 70. In particular, the received event notification 42 may serve as an indication that the user 4 is currently addressing (i.e., standing in front of) the consumer electronic device 20 to conduct an individualized vending or other transaction. It should be understood that in the event the user 4 is not addressing the consumer electronic device 20, the notification 42 may alternatively comprise a message indicating that no user has attempted to address the consumer electronic device 20 after the expiration of a predetermined timeout period.

From operation 320, the routine 300 continues to operation 325, where the application 28 executing on the consumer electronic device 20, may conduct an individualized interaction with the mobile computing device 10. In particular, the consumer electronic device 20, having received the user ID 14 and the preference data 15 for the user 4 in the notification 42, may conduct an interaction unique to the user 4 which may include the display of the personalized content 25 on the display 24. From operation 325, the routine 300 then ends.

Figure 4:
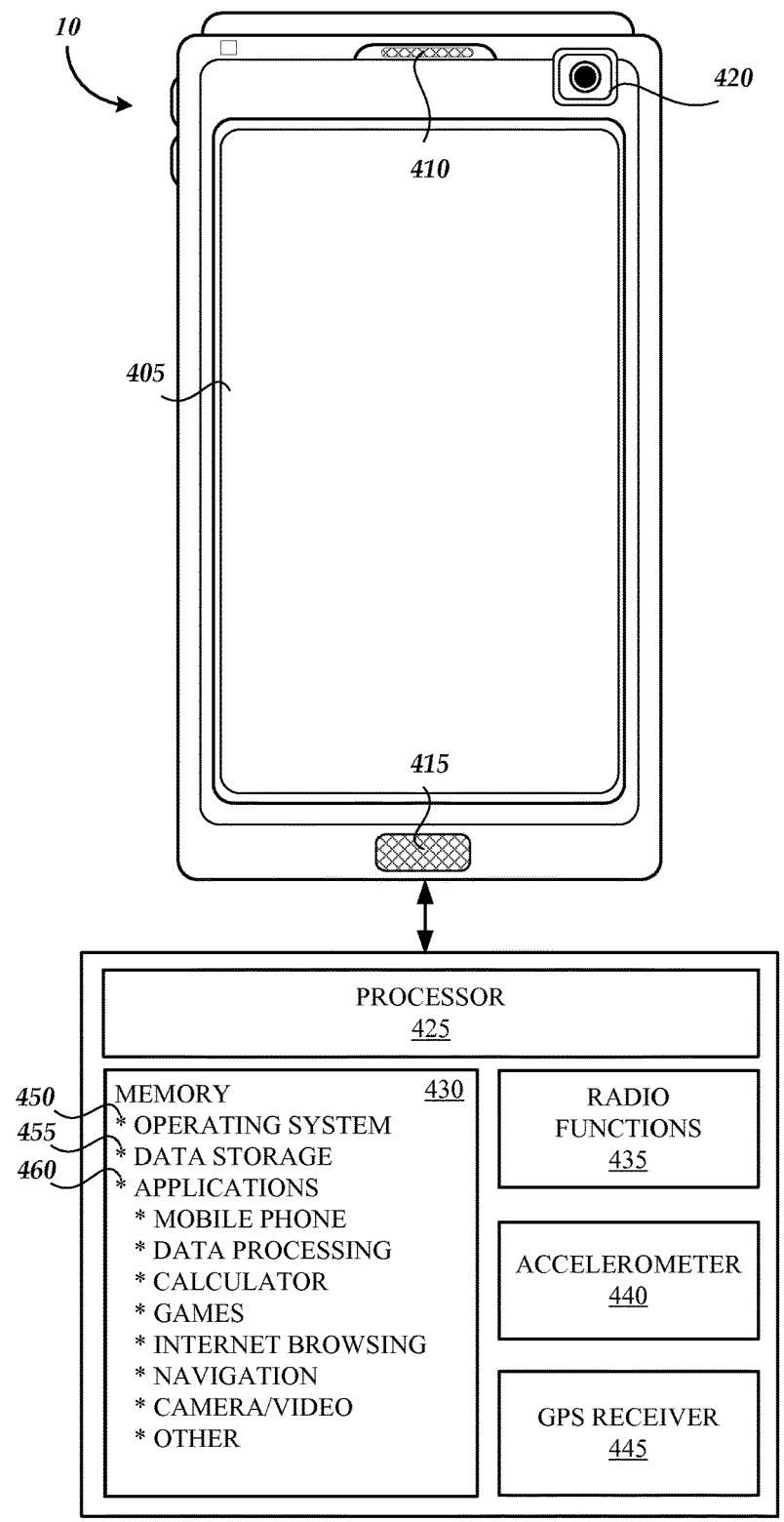
FIG. 4 is a simplified block diagram of a mobile computing device with which various embodiments may be practiced.

FIG. 4 illustrates a suitable mobile computing environment, for example, the mobile computing device 10 which may include, without limitation, a smartphone, a tablet personal computer, a laptop computer, and the like, with which various embodiments may be practiced. In a basic configuration, the mobile computing device 10 is a handheld computer having both input elements and output elements. Input elements may include touch screen display 405 which allows the user to enter information into the mobile computing device 10, microphone 415 and camera 420. In alternative embodiments, the mobile computing device 10 may incorporate additional input elements such as microphone 415 and a physical keypad (not shown). A "soft" keypad (not shown) may also be generated on the touch screen display 405.

The touch screen display 405 on the mobile computing device 10 may also comprise an output element which can display a graphical user interface (GUI). Other output elements include speaker 410. Additionally, the mobile computing device 10 may incorporate a vibration module (not shown), which causes the mobile computing device 10 to vibrate to notify the user of an event. In yet another embodiment, the mobile computing device 10 may incorporate a headphone jack (not shown) for providing another means of providing output signals.

The mobile computing device 10 may also comprise a number of components for implementing some embodiments. The components may include processor 425, memory 430, radio functions 435 and accelerometer 440 and GPS receiver 445. The memory 430 may be utilized for storing an operating system 450 and include data storage 455. The memory 430 may also include a number of applications 460 including, but not limited to, a mobile phone application, a data processing application, a calculator, games, an Internet browser, navigation a camera/video application and other applications such as the application 12 which may be utilized for facilitating an individualized interaction with the consumer electronic device 20, discussed above. The radio functions 435 may support short range wireless communications via NFC, BLUETOOTH wireless technology, Wi-Fi or other wireless technologies. It should be understood that the radio functions 435 may also be utilized to connect to the Internet (or other types of networks) as well as to remote computing systems.

Figure 5:
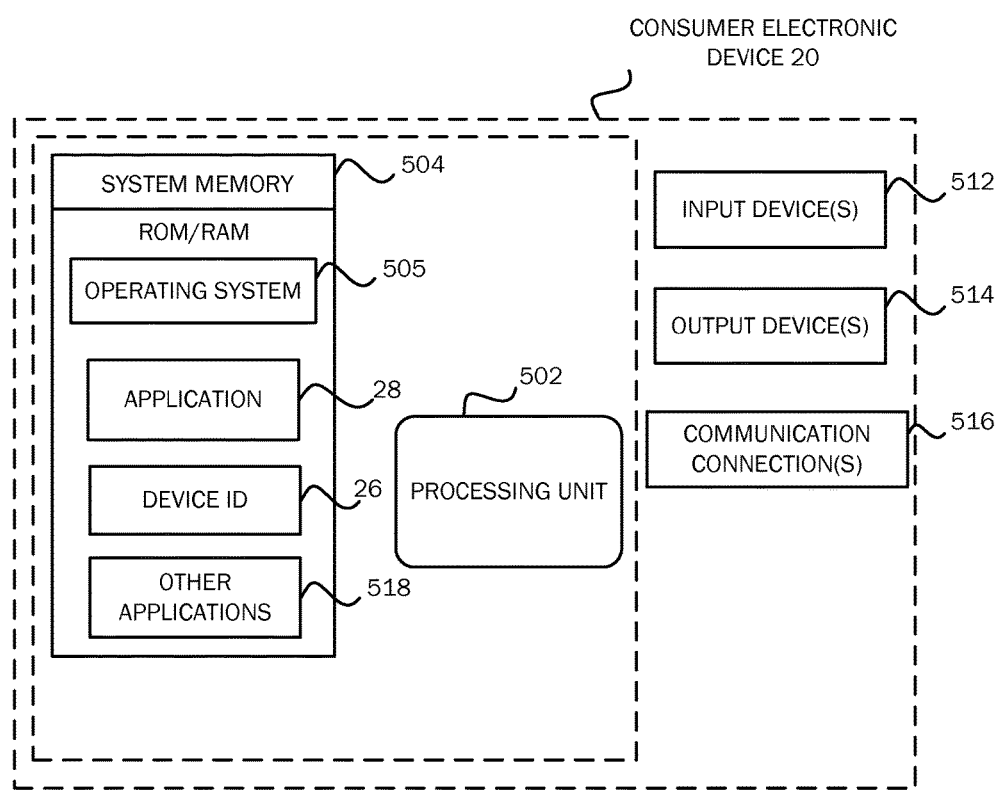
FIG. 5 is a simplified block diagram of an electronic device with which various embodiments may be practiced.

FIG. 5 is a simplified block diagram of the consumer electronic device 20 with which various embodiments may be practiced. In a basic configuration, the consumer electronic device 20 may comprise a computing device which includes at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include an operating system 505, the application 28, the device ID 26 and other applications 518. The operating system 505 may be suitable for controlling the consumer electronic device 20's operation.

The consumer electronic device 20 may have additional features or functionality. For example, the consumer electronic device 20 may also include additional data storage devices (not shown) which may be removable and/or non-removable such as, for example, magnetic disks, optical disks, solid state storage devices ("SSD"), flash memory or tape. The consumer electronic device 20 may also have input device(s) 512 such as a keyboard, a mouse, a pen, a sound input device (e.g., a microphone), a touch input device, etc. Output device(s) 514 such as a display, speakers, a printer, etc. may also be included. The aforementioned devices are examples and others may be used. Communication connection(s) 516 may also be included and utilized to connect to the Internet (or other types of networks) as well as to remote computing systems.

Various embodiments, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information (such as computer readable instructions, data structures, program modules, or other data) in hardware. The system memory 504 (as well as the memory 430 in the mobile computing device 10 of FIG. 4) is an example of computer storage media (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the consumer electronic device 20. Any such computer storage media may also be part of the consumer electronic device 20. Computer storage media does not include a carrier wave or other propagated or modulated data signal.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Various embodiments are described above with reference to block diagrams and/or operational illustrations of methods, systems, and computer program products. The operations/acts noted in the blocks may be skipped or occur out of the order as shown in any flow diagram. For example, two or more blocks shown in succession may in fact be executed substantially concurrently or the blocks may sometimes be executed in the reverse order, depending upon the functionality/acts involved.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of determining that a user is ready to commence interacting with an electronic device and facilitating an individualized interaction for the user at the electronic device, comprising:
- establishing a continuous communication session between the electronic device and a server;
- receiving at the server an identity of the electronic device from a smartphone associated with the user, wherein the smartphone has retrieved the identity of the electronic device from the electronic device by one or more of:
  - scanning a barcode visible on the electronic device;
  - scanning a symbol visible on the electronic device;
  - reading a Near Field Communication Tag associated with the electronic device;
  - receiving a user input into the smartphone of information associated with the identity of the electronic device;
- determining at the server, based on the received identity of the electronic device, that the smartphone is proximate the electronic device; and
- initiating, in response to the determination at the server that the smartphone is proximate to the electronic device, an individualized interaction with the user at the electronic device via communications between the server and the electronic device utilizing the continuous communication session between the server and the electronic device, using one or more server push techniques and preference data associated with the user at the server.

2. The method of claim 1, wherein scanning a barcode visible on the electronic device comprises one or more of:
- scanning a barcode rendered on a display of the electronic device;
- scanning a barcode made visible on one or more surfaces of the electronic device.

3. The method of claim 1, wherein scanning a symbol visible on the electronic device comprises one or more of:
- scanning a symbol rendered on a display of the electronic device;
- scanning a symbol made visible on one or more surfaces of the electronic device.

4. The method of claim 1, wherein receiving at the server an identity of the electronic device from a smartphone associated with the user comprises receiving:
- the device identification of the electronic device;
- a user identification associated with the smartphone; and
- preference data for conducting an individualized interactive session with the electronic device.

5. The method of claim 1, wherein the individualized interaction is an individualized beverage dispensing session with the user associated with the smartphone.

6. The method of claim 1, wherein using one or more server push techniques comprises utilizing one or more of:
- long polling techniques;
- web socket techniques;
- Comet techniques;
- Berkeley socket techniques.

7. The method of claim 1, wherein establishing a continuous communication session between the electronic device and the server comprises establishing the continuous communication session prior to receiving, at the smartphone associated with the user, the identity of the electronic device.

8. An apparatus for initiating an individualized interaction for a user at a consumer electronic device, comprising:
- a memory for storing executable program code; and
- a processor, functionally coupled to the memory, the processor being responsive to computer-executable instructions contained in the program code and operative to:
  - receive an identity of the consumer electronic device, wherein the identity of the consumer electronic device is retrieved from the consumer electronic device by one or more of:
    - scanning a barcode visible on the consumer electronic device;
    - scanning a symbol visible on the consumer electronic device;
    - reading a Near Field Communication Tag associated with the consumer electronic device;
    - receiving a user input into the apparatus of information associated with the identity of the consumer electronic device; and
  - send the identity of the consumer electronic device to a server such that the server can determine that the apparatus is proximate the consumer electronic device and initiate an individualized interaction for a user associated with the apparatus at the consumer electronic device using preference data associated with the user stored at the server and communicated to the consumer electronic device via a previously established communication session between the server and the consumer electronic device.

9. The apparatus of claim 8, wherein the apparatus comprises a smartphone.

10. The apparatus of claim 8, wherein the consumer electronic device comprises a beverage dispensing machine.

11. The apparatus of claim 8, wherein the consumer electronic device comprises a vending machine.

12. The apparatus of claim 8, wherein the apparatus comprises a tablet.

13. The apparatus of claim 8, wherein the processor, in sending the identity of the consumer electronic device to the server, is operative to send the device identification of the consumer electronic device, a user identification associated with the user, and preference data associated with the user for conducting an individualized interactive session with the consumer electronic device, to the server.

14. The apparatus of claim 8, wherein the individualized interaction is initiated via the previously established communication session due to the utilization of a server push technique by the consumer electronic device.

15. The apparatus of claim 8, wherein the individualized interaction is an individualized beverage dispensing session with the user.

16. A computer-readable non-transitory storage medium storing computer executable instructions which, when executed by a computing device, will cause the computing device to perform acts comprising:
- allowing a user to retrieve an identity of an electronic device with which the user would like to interact, by one or more of:
  - allowing the user to scan a barcode visible on the electronic device;
  - allowing the user to scan a symbol visible on the electronic device;
  - reading a Near Field Communication Tag associated with the electronic device; and
- sending the identity of the electronic device to a server such that the server can determine that the computing device is proximate the electronic device and initiate an individualized interaction for the user at the electronic device via a previously open communication session between the server and the electronic device utilizing one or more server push techniques, the individualized interaction being initiated in response to the determination that the computing device is proximate to the electronic device.

17. The computer-readable non-transitory storage medium of claim 16, wherein allowing the user to scan a barcode visible on the electronic device comprises one or more of:

allowing the user to scan a barcode rendered on a display of the electronic device;

allowing the user to scan a barcode made visible on one or more surfaces of the electronic device.

18. The computer-readable non-transitory storage medium of claim 16, wherein allowing the user to scan a symbol visible on the electronic device comprises one or more of:

allowing the user to scan a symbol rendered on a display of the electronic device;

allowing the user to scan a symbol made visible on one or more surfaces of the electronic device.

19. The computer-readable non-transitory storage medium of claim 16, wherein initiating the individualized interaction for the user at the electronic device comprises facilitating an individualized beverage dispensing session with the user at the electronic device.

20. The computer-readable non-transitory storage medium of claim 16, wherein sending the identity of the electronic device from the computing device to a server comprises sending the device identification of the electronic device, a user identification associated with the computing device, and preference data for conducting an individualized interactive session with the electronic device, to the server.

21. The computer-readable non-transitory storage medium of claim 16, wherein the individualized interaction is an individualized beverage dispensing session with a user of the computing device.

* * * * *